United States Patent
Matsuo

(10) Patent No.: US 8,644,496 B2
(45) Date of Patent: Feb. 4, 2014

(54) ECHO SUPPRESSOR, ECHO SUPPRESSING METHOD, AND COMPUTER READABLE STORAGE MEDIUM

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 12/142,826

(22) Filed: Jun. 20, 2008

(65) Prior Publication Data
US 2009/0010445 A1 Jan. 8, 2009

(30) Foreign Application Priority Data

Jul. 3, 2007 (JP) ................................ 2007-175581

(51) Int. Cl.
*H04M 9/08* (2006.01)
*A61F 11/06* (2006.01)
*H04B 3/20* (2006.01)

(52) U.S. Cl.
USPC ................. 379/406.12; 381/71.1; 381/71.12; 370/286

(58) Field of Classification Search
USPC .............. 381/66, 93, 94.1, 94.3, 71.1, 71.11, 381/71.12; 379/406.01–406.16; 370/282–286; 455/570
See application file for complete search history.

(56) References Cited

U.S. PATENT DOCUMENTS

| | | | |
|---|---|---|---|
| 5,442,712 A * | 8/1995 | Kawamura et al. ............. | 381/83 |
| 6,510,224 B1 * | 1/2003 | Christensson et al. ... | 379/406.03 |
| 6,539,091 B1 | 3/2003 | Schertler | |
| 6,834,108 B1 | 12/2004 | Schmidt | |
| 7,272,224 B1 * | 9/2007 | Normile et al. .......... | 379/406.01 |
| 2003/0072362 A1 | 4/2003 | Awad et al. | |
| 2003/0076947 A1 * | 4/2003 | Furuta et al. ............. | 379/406.01 |
| 2004/0086109 A1 * | 5/2004 | Takada ..................... | 379/406.08 |
| 2005/0089148 A1 * | 4/2005 | Stokes et al. ...................... | 379/3 |
| 2005/0220292 A1 * | 10/2005 | Okumura et al. ........ | 379/406.12 |
| 2007/0206777 A1 * | 9/2007 | Fadili et al. ............. | 379/406.01 |
| 2007/0210942 A1 * | 9/2007 | Lutkemeyer .................... | 341/50 |
| 2007/0280472 A1 * | 12/2007 | Stokes, III et al. ....... | 379/406.01 |
| 2008/0219432 A1 * | 9/2008 | Ahmadi ................... | 379/406.06 |
| 2010/0211382 A1 * | 8/2010 | Sugiyama ..................... | 704/205 |

FOREIGN PATENT DOCUMENTS

| | | |
|---|---|---|
| DE | 197 14 966 | 10/1998 |
| DE | 198 06 015 | 8/1999 |
| JP | 11-331046 | 11/1999 |
| JP | 11331046 A * | 11/1999 |
| JP | 2002-237769 | 8/2002 |

OTHER PUBLICATIONS

An English machine translation of Sakauchi et al (JP11-331046A)
Abstract of Sakauchi et al (JP11-331046A).*

(Continued)

*Primary Examiner* — Daniel Luke
*Assistant Examiner* — Khaja Ahmad
(74) *Attorney, Agent, or Firm* — Katten Muchin Rosenman LLP

(57) ABSTRACT

An apparatus is provided for suppressing an echo signal included in a measured signal corresponding to a measured sound. In the apparatus, the measured signal and a reference signal in a time domain are transformed into a frequency domain, and calculated for obtaining each value of a ratio and a correlation between the measured signal and the reference signal in the frequency domain. With executing a comparison of the values of the ratio and the correlation, a coefficient is derived, where a product of the coefficient and the measured sound in the frequency domain gives an estimated value of the echo signal. The echo in the measured signal is suppressed with subtracting the estimation of the echo signal from the measured signal, respectively in the frequency domain.

11 Claims, 14 Drawing Sheets

(56) References Cited

OTHER PUBLICATIONS

German Office Action dated Oct. 11, 2010, from the corresponding German Application.

Chinese Third Office Action dated Aug. 11, 2011, from corresponding Chinese Application No. 200810135705.9.

* cited by examiner

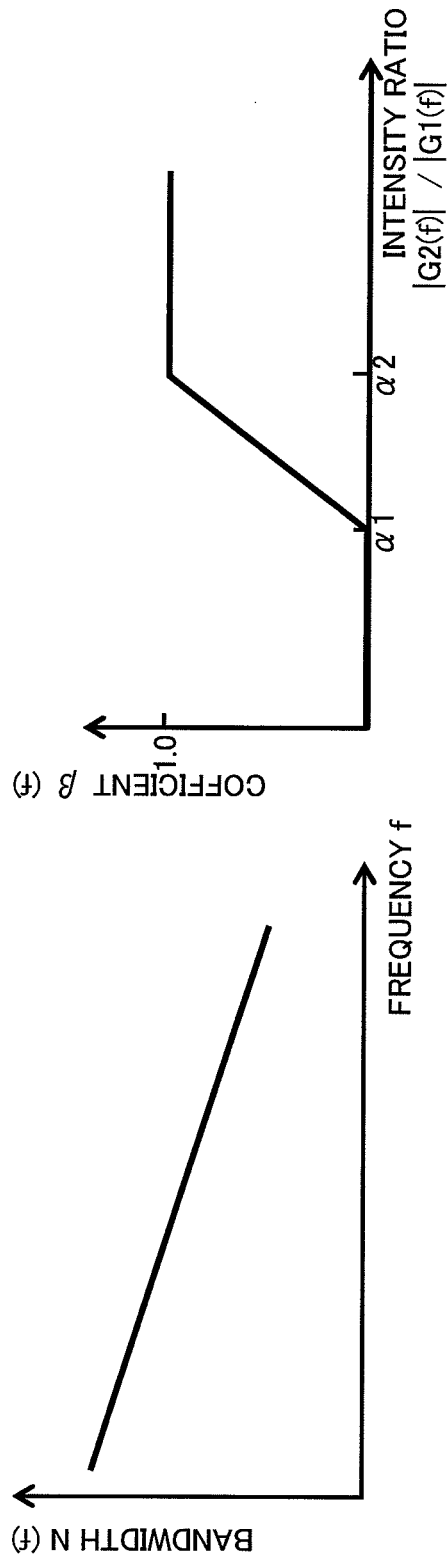

ECHO SUPPRESSOR, ECHO SUPPRESSING METHOD, AND COMPUTER READABLE STORAGE MEDIUM

BACKGROUND OF THE INVENTION

1. Field of the Invention

The present invention relates to the echo suppressing, more particularly, to a echo suppressor, a method, and a computer readable storage medium for suppressing the echo caused by a sound which is generated by a sound output device.

2. Description of the Related Art

The speech recognition technique has been developed, while not reached to a perfect degree. For example, pressing a push-to-talk switch to mute a car navigation system can allow the system to accurately recognize the user's auditory instruction. But no redundant operation, such as the operation of pressing the push-to-talk switch, prior to speak to the system is demanded. To improve saving the operation needs an echo cancellation to suppress an echo caused by sounds emitted from a loudspeaker of the system to a microphone. More particularly, a sound form one of a plurality of loudspeakers in a multichannel car audio system will result in a noise affecting the voice of the user, as the sound will be received with a microphone designated for receiving user's auditory instruction. Therefore, a method of an improved echo cancellation is demanded for cancelling a sound emitted from a car audio system and received by a microphone provided for a speech recognition system.

FIG. 12 shows one of proposed echo cancelling systems, in which a conventional echo suppressing method (echo cancelling method) is applied to a multi-channel audio system. The method of echo suppressing in the system depends on that for a monophonic-channel audio system method by which echo-cancelling for one channel as shown in FIG. 12. Plural sound signals sent from an multichannel audio system 2000 are fed to corresponding loudspeakers 2001-1, - - - , and 2001-$n$ each of which emits sound according to each signal. The echo suppressor 1000 operates so as to eliminate an echo signal from affected sound signal activated by the sound received by the microphone 2002, where the echo signal is a summation of sound signals derived by a plurality of channels.

The echo removal is carried out by suppressing an echo of an observation sound signal y(t) generated based on a received sound using reference sound signals x1(t), . . . , and xn(t) generated based on output sounds of plural channels(n) with plural suppressing mechanisms (echo cancellers) 1001-1, . . . , and 1001-$n$ corresponding to the reference signals x1(t), . . . , and xn(t).

Besides the structure of FIG. 12, another echo suppressor realized by applying an echo suppressing method adaptable to a monophonic-channel audio system to a multi-channel audio system is proposed. FIG. 13 is a schematic diagram showing a conventional second echo suppressor. The second echo suppressor 1000 adds reference sound signals x1(t), . . . , and xn(t) generated based on sounds of plural channels with an adding mechanism 1002 to generate an added reference signal sound x(t) and suppresses an echo of an observation sound signal y(t) based on the added reference sound signal x(t).

FIG. 14 is a functional block diagram showing the functional configuration of the suppressing mechanisms 1001 of the conventional echo suppressor. Each suppressing mechanism 1001 includes a detecting unit 10010 for detecting a double-talk state in which a speaker is speaking and a single-talk state in which a speaker is not speaking (during the utterance of the car audio system), a filter factor updating unit 10011 for updating a filter coefficients necessary for estimating an echo level through processing based on the adaptive normalized least mean square (NLMS) algorithm, a linear finite impulse response (FIR) filter 10012 for estimating an echo signal x'(t) based on the reference sound signal x(t) through several-hundred-order inner product computation, and a subtracting unit 10013 for removing the echo signal x'(t) from the observation sound signal y(t) to obtain and output a suppression result r(t) with a reduced echo. The detecting unit 10010 detects the single-talk state and the double-talk state based on intensity change in the suppression result r(t). On the basis of resultant double-talk state, the detecting unit 10010 prompts the filter factor updating unit 10011 to stop updating a filter coefficient. The filter factor updating unit 10011 calculates a filter factor (coefficient) based on the suppression result r(t).

The echo suppressor 1000 shown in FIG. 12 includes the suppressing mechanisms 1001 of FIG. 14 for each channel corresponding to the reference sound signals x1(t), . . . , and xn(t). The echo suppressing method described above is shown, for example, in Japanese Laid-open Patent Publication No. 2002-237769.

However, the adaptation processing based on the NLMS as shown in FIG. 14 suppresses an echo in accordance with past learning results, which causes a problem of a low capability of following a large change of an observation signal at the shift between the single-talk state and the double-talk state. This leads to another problem of erroneous voice recognition that would occur by detecting a state just after a speaker starts speaking as the single-talk state or detecting a state involving an echo only as the double-talk state.

Further, the method using suppressing mechanisms corresponding to each channel as shown in FIG. 12 has a problem of increasing a cost and an apparatus size. In particular, in the case of applying this method to a car navigation system having rigid constraints on its installation space, the problem of increasing the size would become serious.

Further, as shown in FIG. 13, in the case of using an added reference sound signal of a monophonic channel, which is obtained by adding reference sound signals, a problem of increasing a residual error that remains to be suppressed occurs. This is because, in an output unit of the multi-channel audio unit 2000, which outputs sounds of music etc., reproduced sounds from each speaker and intensities thereof independently change, so echoes in plural paths will be difficult to be learned and estimated through one adaptation processing.

SUMMARY

One of the objects of the present invention is to provide an echo suppressor: the echo suppressor converts a reference sound signal and an observation sound signal in time domain to components on a frequency axis (in a frequency domain); calculates values representing a ratio and correlation between the converted reference sound signal and observation sound signal; compares the values representing the ratio and correlation; determines a estimation coefficient necessary for estimating an echo level based on the comparison result, and the ratio and correlation; estimates an echo level using the estimation coefficient; and suppresses the observation sound signal based on the estimated echo level. The echo suppresser and the method according to the present invention may carry out speech recognition in smaller delay and with more accurate than an echo suppresser using the normalized least mean square (NLMS) Algorithm even when a large change of the observation sound signal occurs at a boundary between a single-talk and a double-talk.

Further, it is another object of the present invention to provide an echo suppressor having the following functions. That is, in the case of using plural reference sound signals, the suppressor carries out echo suppressing processing based on a signal obtained by adding the reference sound signals. Thus, it is unnecessary to perform suppressing processing for each channel. Therefore, it is possible to reduce a cost and an apparatus size as well as to avoid a problem of increasing a residual echo beyond an estimation ability because adaptation processing based on learning identification is not used.

According to a first aspect of the invention, an echo suppressor that can operate in concert with a sound output device for generating a sound signal and outputting a sound from a sound output unit, and a sound processing device for processing an observation sound signal based on a sound input from a sound input unit, and suppresses an echo of the observation sound signal, is characterized by including: a converting unit for converting a reference sound signal for generating a sound output to the sound output unit and an observation sound signal generated using a sound input from the sound input unit to components on a frequency axis; a calculating unit for calculating a ratio and correlation between the components on the frequency axis in the reference sound signal and the observation sound signal; a comparison unit for comparing values of the ratio and the correlation; a determination unit for deriving an estimation factor necessary for estimating the echo from a comparison result, and the ratio and the correlation; an estimation unit for estimating the echo using the estimation factor; and a suppressing unit for suppressing the observation sound signal based on the estimated echo.

According to a second aspect of the invention, the echo suppressor according to the first aspect further includes: an adding unit for adding a plurality of the reference sound signals, the suppressor being characterized in that the converting unit is configured to convert the observation sound signal and the added reference sound signal to components on the frequency axis.

According to a third aspect of the invention, the echo suppressor according to the first or second aspect is characterized in that the calculating unit is configured to determine a correlation between a reference sound signal and an observation sound signal at each frequency in a predetermined frequency range including a target frequency, and change the predetermined frequency range in accordance with the target frequency.

According to a fourth aspect of the invention, the echo suppressor according to any one of the first to third aspects is characterized in that the determination unit is configured to set a plurality of threshold values for comparing values of the ratio and the correlation, and determine whether a state is a single-talk state or a double-talk state based on the plurality of threshold values, the ratio, and the correlation.

According to a fifth aspect of the invention, the echo suppressor according to the fourth aspect is characterized in that the determination unit is configured to change the plurality of threshold values used for determining whether the state is a single-talk state or a double-talk state based on the ratio and the correlation in accordance with a frequency.

According to a sixth aspect of the invention, the echo suppressor according to the fifth aspect is characterized in that the calculating unit is configured to determine values of the ratio and the correlation based on a value obtained by multiplying a complex spectrum converted from an observation sound signal by a complex conjugate number of a complex spectrum converted from a reference sound signal and a value obtained by multiplying the complex spectrum converted from the reference sound signal by a complex conjugate number of the complex spectrum converted from the reference sound signal.

According to a seventh aspect of the invention, the echo suppressor according to a sixth aspect is characterized in that the estimation unit is configured to estimate an amplitude spectrum of an echo, and the suppressing unit is configured to suppress an amplitude spectrum of an observation sound signal if a ratio of the amplitude spectrum of the observation signal to the amplitude spectrum of the echo is not smaller than a predetermined threshold value.

According to an eighth aspect of the invention, the echo suppressor according to the seventh aspect is characterized in that the suppressing unit is configured to change the threshold value in accordance with a target frequency.

According to a ninth aspect of the invention, an echo suppressing method for suppressing an echo of an observation sound signal with an echo suppressor that can operate in concert with a sound output device for generating a sound signal and outputting a sound from a sound output unit, and a sound processing device for processing the observation sound signal based on a sound input from a sound input unit, is characterized by including: a step (operation) of converting a reference sound signal for generating a sound output to the sound output unit and an observation sound signal generated using a sound input from the sound input unit to components on a frequency axis; a step of calculating a ratio and correlation between the components on the frequency axis in the reference sound signal and the observation sound signal; a step of comparing values of the ratio and the correlation; a step of deriving an estimation factor necessary for estimating the echo from a comparison result, and the ratio and the correlation; a step of estimating the echo using the estimation factor; and a step of suppressing the observation sound signal based on the estimated echo.

According to a tenth aspect of the present invention, a computer program product that is loaded to a computer and defines steps executed on the computer to suppress an echo of an observation sound signal in concert with a sound output device for generating a sound signal and outputting a sound from a sound output unit, and a sound processing device for processing the observation sound signal based on a sound input from a sound input unit, is characterized in that the program product causes a computer to execute: a step of converting a reference sound signal for generating a sound output to the sound output unit and an observation sound signal generated using a sound input from the sound input unit to components on a frequency axis; a step of calculating a ratio and correlation between the components on the frequency axis in the reference sound signal and the observation sound signal; a step of comparing values of the ratio and the correlation; a step of deriving an estimation factor necessary for estimating the echo from a comparison result, and the ratio and the correlation; a step of estimating the echo using the estimation factor; and a step of suppressing the observation sound signal based on the estimated echo.

According to the first, ninth, and tenth aspects of the invention, whether a current state is a single-talk state or a double-talk state is determined on real time based on a relationship between a ratio and a correlation to change an echo estimating method as appropriate. Thus, it is unnecessary to reference past signals, so no delay occurs upon determination as to a boundary between the single-talk state and the double-talk state unlike in adaptation processing based on learning identification.

According to the second aspect of the present invention, the suppressor can be adapted to a multi-channel audio system, and it is unnecessary to estimate an echo for each reference sound signal and thus to provide a suppressing unit for each channel. Accordingly, it is possible to prevent increases in a cost of a suppressing circuit and an installation space. Further, the suppressor does not perform adaptation processing based on learning identification, so a problem of increasing a residual echo beyond an estimation ability does not occur.

According to the third aspect of the invention, for example, a predetermined frequency range used for calculation is increased toward the lowest frequency that is difficult to detect a difference between a voice sound of a speaker and a sound output based on a reference sound signal to relatively increase correlation detection sensitivity to improve a double-talk detection accuracy.

According to the fourth aspect of the invention, for example, if the ratio is smaller than a threshold value of the correlation, the suppressor judges a current state as a single-talk state with a high correlation between a reference sound signal and an observation sound signal. Then, an echo can be estimated based on the ratio and the reference sound signal as an estimation factor. Further, for example, if the signal ratio is not smaller than a second threshold value of the correlation, the suppressor judges a current state as a double-talk state with a low correlation between the reference sound signal and the observation sound signal. Then, an echo can be estimated based on the correlation and the reference sound signal as an estimation factor.

According to the fifth aspect of the invention, a threshold value is decreased from the lower frequency to the higher frequency to increase detection accuracy of the double-talk state to suppress a distortion of a speaker's voice. In addition, the threshold value is increased from the lower frequency to the higher frequency to increase detection accuracy of the single-talk state to suppress a residual echo.

According to the sixth and seventh aspects of the present invention, an amplitude spectrum corresponding to a real part of a complex spectrum is used, so a computation load can be reduced.

According to the eighth aspect of the invention, a threshold value is decreased from the lower frequency to the higher frequency to increase detection accuracy of the double-talk state to suppress a distortion of a speaker's voice. In addition, the threshold value is increased from the lower frequency to the higher frequency to increase detection accuracy of the single-talk state to suppress a residual echo.

BRIEF DESCRIPTION OF THE DRAWINGS

FIG. 5 is a graph showing a relationship between a frequency and varying band widths N in an echo suppressing method according to the first embodiment of the present invention;

FIG. 6 is a graph showing a relationship between an intensity ratio and a coefficient corresponding to an echo estimation coefficient, where the intensity ratio is a ration between a correlation and a signal ratio;

DESCRIPTION OF THE PREFERRED EMBODIMENTS

Hereinafter, the present invention will be described in detail with reference to the drawings illustrating embodiments of the present invention.

First Embodiment

Figure 1:
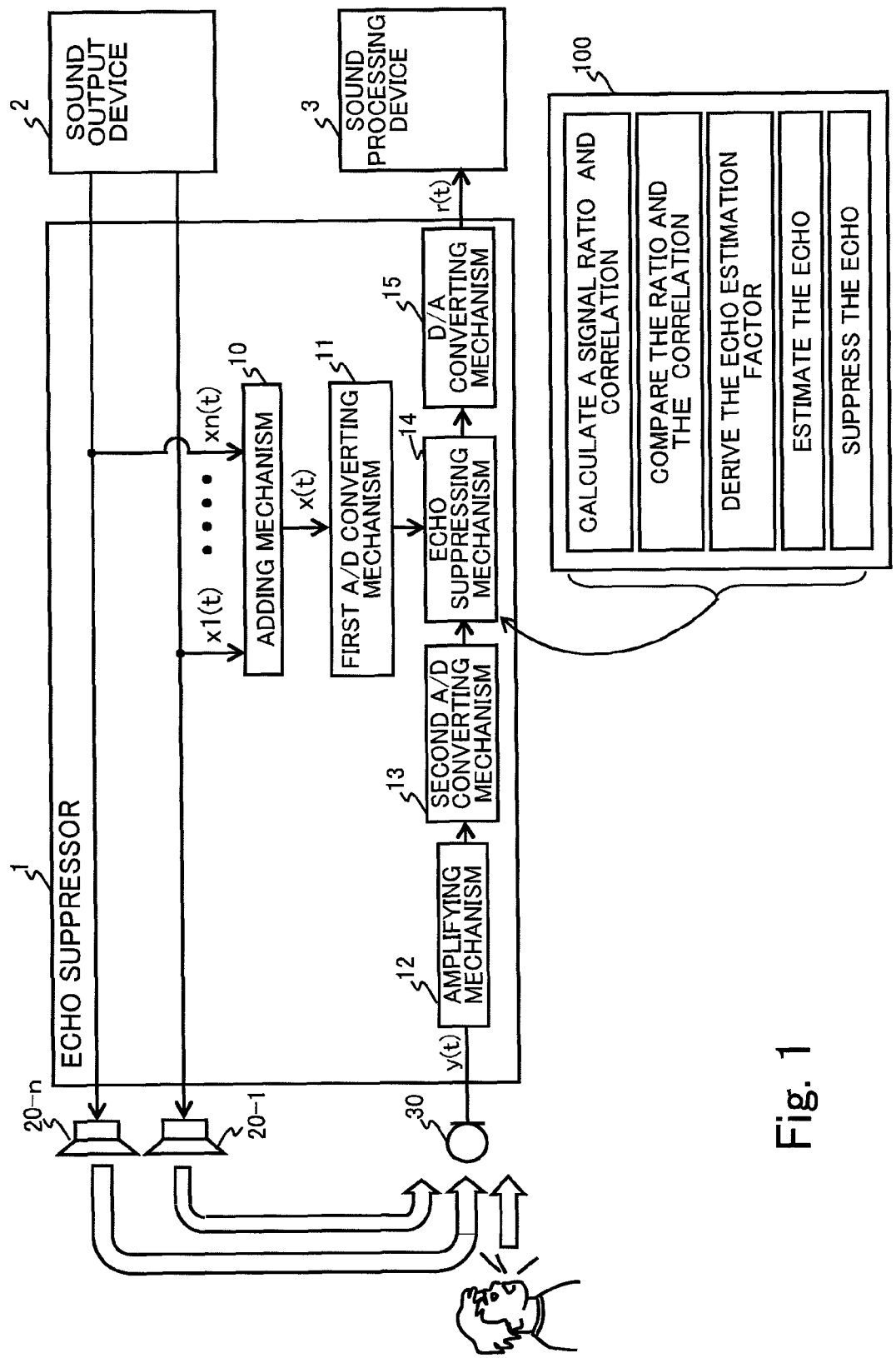
FIG. 1 is a schematic diagram showing a configuration example of an echo suppressor according to a first embodiment of the present invention.

FIG. 1 is a schematic diagram showing a configuration example of an echo suppressor according to a first embodiment of the present invention. In FIG. 1, an echo suppressor 1 can be composed with a computer in, for example, a teleconference system or an in-vehicle navigation system, while the echo suppressor 1 may be composed with a dedicate computer. The echo suppressor 1 cooperates with a sound output device 2 such as a multi-channel audio unit and a sound processing device 3 such as a voice recognition system. The sound output device 2 sends output sound signals as analog signals of plural channels of plural sound output units 20-1, - - - , and 20-n such as a loudspeaker, and output as sounds are emitted therefrom. Further, a sound input unit 30 such as a capacitor microphone picks up an external sound and generates an input sound signal as an analog signal based on the picked sound to output the generated signal to the sound processing device 3. The echo suppressor 1 has an echo cancelling function of removing echoes of sounds output from the sound output units 20-1, - - - , and 20-n from a sound input to the sound input unit 30. In the following description, in particular, n (n is a natural number) output sound signals in the echo suppressor 1 are referred to as reference sound signals x1(t), - - - , and xn(t), and an input sound signal is referred to as an observation sound signal (or a measured sound signal) y(t).

The echo suppressor 1 further includes an adding mechanism 10 such as an analog mixer for adding plural reference sound signals x1, - - -, and xn to generate an added reference sound signal x(t), a first A/D (Analog to Digital) converting mechanism 11 for sampling the generated added reference sound signal x(t) with a frequency of 8,000 Hz, for example, to convert the signal to a digital signal, and performing anti-aliasing filtering processing with an LPF (Low Pass Filter) so as to prevent an aliasing error (aliasing) that wound occur upon the conversion to a digital signal; an amplifying mechanism 12 such as an amplifier for amplifying the observation sound signal y(t); a second A/D converting mechanism 13 for sampling the amplified observation sound signal y(t) (hereinafter referred to as the observation sound signal y(t)) with a frequency of 8,000 Hz, for example to convert the signal to a digital signal, and performing anti-aliasing filtering processing; an echo suppressing mechanism 14 such as a DSP (Digital Signal Processor), which executes echo suppressing processing to correct the observation sound signal y(t) on the basis of the added reference sound signal x(t) and then outputs a suppression result signal r(t) as a processed digital signal; and a D/A (Digital to Analog) converting mechanism 15 for converting the suppression result signal r(t) to an analog signal and outputting the converted signal to the sound processing device 3. The echo suppressing mechanism 14, in the first embodiment as one aspect of the present invention, is an operational circuit to which a computer program 100, data and other as a firmware are installed. The computer executes the computer program 100 installed as firmware to thereby operate as the echo suppressor 1. The sound processing device 3 executes voice recognition processing or the like on the basis of the received suppression result signal r(t).

Figure 2:
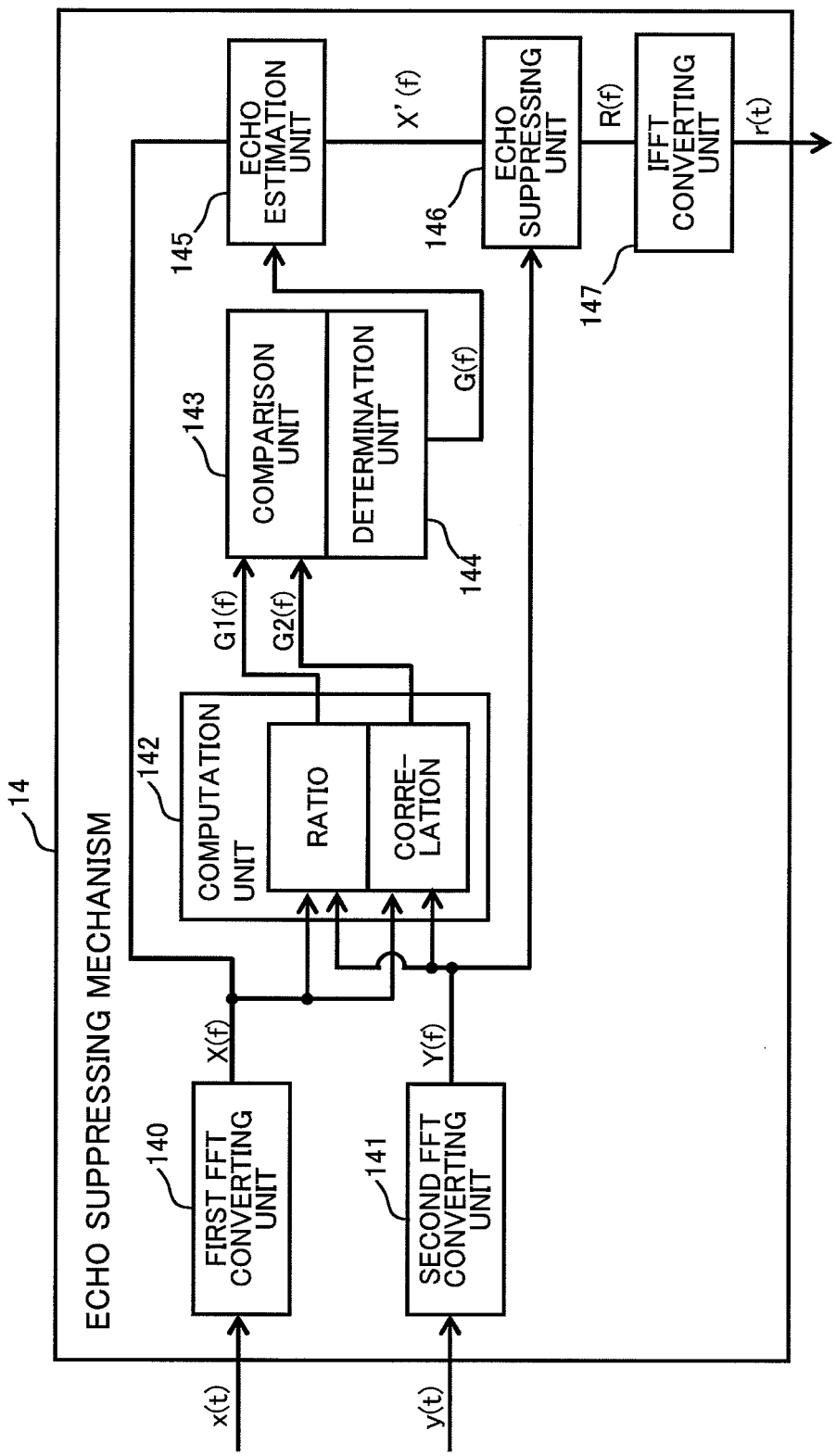
FIG. 2 is a functional block diagram showing a functional configuration example of an echo suppressing mechanism of the echo suppressor according to the first embodiment of the present invention.

FIG. 2 is a functional block diagram showing a functional configuration example of the echo suppressing mechanism 14. The echo suppressing mechanism 14 clips frames of a predetermined length of 20 to about 40 ms from the added reference sound signal x(t) and the observation sound signal y(t) converted to digital signals. The frames overlap with each other by about 10 ms to 20 ms. Each frame is subjected to frame processing generally used in the field of voice recognition such as filtering with a window function such as a Hamming window or a Hanning window, or a pre-emphasis filter. The thus-generated frames are each subjected to the following signal processing based on various functions.

The echo suppressing mechanism 14 can function as a first and second FFTs 140, 141 when executing the computer program 100, where the first FFT 140 transforms the added reference sound signal x(t) in time domain to a transformed reference sound signal X(f), hereinafter referred to as a reference sound signal X(f), in frequency domain at every frame and a second FFT 141 for a observation sound signal y(t) in a time domain to a observation sound signal Y(f), hereinafter referred to as a observation sound signal Y(f), in a frequency domain at every frame as well. In short, where the FFTs 140 and 141 transform each of signals x(t) and y(t) in a time domain to each of signals X(f) and Y(f) in a frequency domain at every frame, respectively for each frame.

The reference sound signal X(f) and the observation sound signal Y(f) have complex spectrum. In addition, DCT (Discrete Cosine Transform) and other such transforming methods may be used as the transformation.

Further, the echo suppressing mechanism 14 can function as a computation unit 142 when executing the computer program 100. The computation unit 142 determines a signal ratio G1(*f*) and a correlation G2(*f*), the signal ratio G1(*f*) is a ratio, shown in equation 1 described below, between the observation sound signal Y(f) and the reference sound signal X(f) at a corresponding frequency f, and a correlation G2(*f*), shown in equation 2 described below, represents a ratio of similarity between the observation sound signal Y(f) and the reference sound signal X(f) at a corresponding frequency f. Here, the observation sound signal Y(f) and the reference sound signal X(f) have complex spectrum, so a signal ratio is calculated after the spectrum is multiplied by a complex conjugate number X*(f) of the reference sound signal X(f) to a real number.

$$G1(f)=\{Y(f)X^*(f)\}/\{X(f)X^*(f)\} \quad \text{Equation (1)}$$

where G1(*f*) is the signal ratio, Y(f) is the observation sound signal, X(f) is the reference sound signal, and X*(f) is a complex conjugate of the reference sound signal.

The computation unit 142 derives the correlation G2(*f*) between the observation sound signal Y(f) and the reference sound signal X(f) from the following equation 2 with each of frequencies f at which the observation sound signal Y(f) and the reference sound signal X(f) should be calculated. This correlation indicates a ratio between the total value of the observation sound signals Y(f) at each frequency f and the total value of the reference sound signals X(f) at each frequency f. Here, the observation sound signal Y(f) and the reference sound signal X(f) have complex spectrum, so the correlation G2(*f*) is calculated after the spectrum is multiplied by a complex conjugate number X*(f) of the reference sound signal X(f) to a real number.

$$G2(f)=\Sigma\{Y(f)X^*(f)\}/\Sigma\{X(f)X^*(f)\} \quad \text{Equation (2)}$$

where G2(*f*) is the correlation.

Further, the echo suppressing mechanism 14 executes the computer program 100 to function as a comparison unit 143 and a determination unit 144. The comparison unit 143 compares the signal ratio G1(*f*) and the correlation G2(*f*), and the determination unit 144 derives an echo estimation factor G(f) (an echo estimation coefficient G(f)) necessary to echo estimation from the signal ratio G1(*f*) and the correlation G2(*f*) based on the comparison result. In particular, the comparison unit 143 compares a signal intensity |G1(*f*)| of the signal ratio G1(*f*) and α-fold signal intensity |G2(*f*)| of the correlation G2(*f*); α represents a predetermined constant based on the following equation 3.

$$|G1(f)|<\alpha|G2(f)| \quad \text{Equation (3)}$$

where |G1(*f*)| is the signal intensity of signal ratio G1(*f*), |G2(*f*)| is the signal intensity of correlation G2(*f*), and α is the constant.

If the signal intensity |G1(*f*)| of the signal ratio G1(*f*) is smaller than the α-fold signal intensity |G2(*f*)| of the correlation G2(*f*), the determination unit 144 judges a current state as a single-talk state with a high correlation between the observation sound signal Y(f) and the reference sound signal X(f), and determines the echo estimation factor G(f) that satisfies a relationship of G(f)=G1(*f*). If the signal intensity |G1(*f*)| of the signal ratio G1(*f*) is not smaller than the α-fold signal intensity |G2(*f*)| of the correlation G2(*f*), the determination unit 144 judges a current state as a double-talk state with a low correlation between the observation sound signal Y(f) and the reference sound signal X(f), and determines the echo estimation factor G(f) that satisfies a relationship of G(f)=G2(*f*). That is, the constant α is used as a threshold value for determining whether the current state is a single-talk state or a double-talk state.

Further, the echo suppressing mechanism 14 executes the computer program 100 to function as an echo estimation unit 145 that estimates an echo spectrum X'(f) as a correction amount for correcting the observation sound signal Y(f) based on the determined echo estimation factor G(f) and the reference sound signal X(f). The echo estimation unit 145 derives an echo X'(f) as the product of the echo estimation factor G(f) and the reference sound signal X(f) from the following equation (4).

$$X'(f)=G(f)X(f) \quad \text{Equation (4)}$$

where X'(f) is the echo.

The echo suppressing mechanism 14 executes the computer program 100 to function as an echo suppressing unit 146 for suppressing the observation sound signal Y(f) on the basis of the derived echo X'(f) to output a suppression result signal R(t) as the suppressed signal. The echo suppressing unit 146 executes signal correction to remove the echo X'(f) from the observation sound signal Y(f) on the basis of the following equation (5) to obtain the suppression result signal R(f) as components on a frequency axis with the echo being suppressed.

$$R(f)=Y(f)-X'(f) \quad \text{Equation (5)}$$

where R(f) is the suppression result signal.

Further, the echo suppressing mechanism 14 executes the computer program 100 to function as an IFFT inverse fast Fourier Transform) converting unit 147 that converts the suppression result signal F(f) as components on the frequency axis, that is in a frequency domain, to a signal on a time axis, that is in a time domain, through IFFT processing. The suppression result signal r(t) converted to a signal on the time axis is output to the sound processing device 3 with the D/A converting mechanism 15 shown in FIG. 1.

Next, processing of the echo suppressor 1 according to the first embodiment of the present invention is described. The echo suppressor 1 receives n reference sound signals x1(t), ---, xn(t) output from the sound processing device 3 to the sound output units 20-1, ---, and 20-n and adds the received n reference sound signals x1(t), ---, and xn(t) into the added reference sound signal x(t) with the adding mechanism 10. Then, the echo suppressor 1 carries out A/D conversion and anti-aliasing filtering processing on the added reference sound signal x(t) with the first A/D converting mechanism 11, and converts the added reference sound signal x(t) into a digital signal to outputs the digital signal to the echo suppressing mechanism 14.

Further, the echo suppressor 1 generates the observation sound signal y(t) based on the received sound with the sound input unit 30, amplifies the observation sound signal y(t) with the amplifying mechanism 12, performs A/D conversion and anti-aliasing filtering processing with the second A/D converting mechanism 13, and converts the signal to a digital signal to output the converted observation sound signal y(t) to the echo suppressing mechanism 14.

Figure 3:
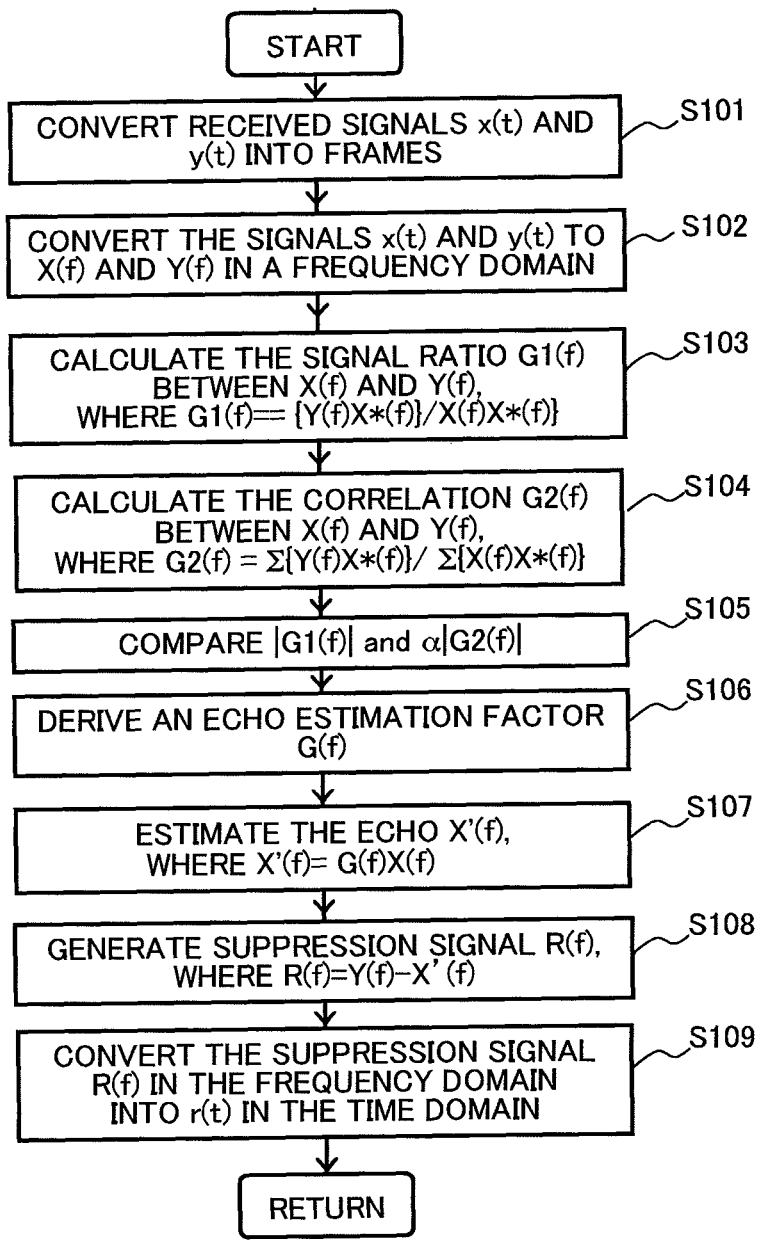
FIG. 3 is a flowchart (operation chart) showing an example of the processing of the echo suppressor according to the first embodiment of the present invention.

FIG. 3 is a flowchart (operation chart) showing an example of the processing of the echo suppressor 1 according to the first embodiment of the present invention. The echo suppressing mechanism 14 of the echo suppressor 1 converts the received added reference sound signal x(t) and observation sound signal y(t) into frames (S101). The added reference sound signal x(t) and the observation sound signal y(t) are converted into the reference sound signal X(f) and the observation sound signal Y(f) as components on the frequency axis with the first FFT converting unit 140 and the second FFT converting unit 141 (S102), in short, the signals x(t) and y(t) are transformed into a frequency domain.

The echo suppressing mechanism 14 of the echo suppressor 1 calculates the signal ratio G1(f) between the reference sound signal X(f) and the observation sound signal Y(f) at each frequency f through the processing of the computation unit 142 (S103), and in addition, calculates the correlation G2 between the reference sound signal X(f) and the observation sound signal Y(f) at each frequency f (S104). In step (operation) S103, the signal ratio G1(f) is calculated on the basis of the above equation (1), and in step S104, the correlation G2(f) is determined on the basis of the above equation (2). The processing in step S103 and the processing in step S104 may be executed in parallel.

The echo suppressing mechanism 14 of the echo suppressor 1 compares the signal ratio G1(f) and the correlation G2(f) with the comparison unit 143 on the basis of the equation (3) (S105), and derives the echo estimation factor G(f) necessary for echo estimation from the signal ratio G1(f) and the correlation G2(f) based on the comparison result (S106). The signal ratio G1(f) or the correlation G2(f) is selected upon deriving the echo estimation factor G(f) in step S106, based on the above equation (3).

The echo suppressing mechanism 14 of the echo suppressor 1 estimates the echo X'(f) based on the echo estimation factor G(f) and the reference sound signal X(f) through the processing of the echo estimation unit 145 (S107). In step S107, the echo X'(f) is calculated as an estimate value of echo for correcting the observation sound signal Y(f) based on the above equation (4).

The echo suppressing mechanism 14 of the echo suppressor 1 suppresses the observation sound signal Y(f) based on the echo X'(f) to generate the suppression result signal R(f) through the processing of the echo suppressing unit 146 (S108). In step S108, the correction is performed to remove the echo X'(f) from the observation sound signal Y(f) based on the above equation (5).

The echo suppressing mechanism 14 of the echo suppressor 1 converts the suppression result signal R(f) as components on the frequency axis to the suppression result signal r(t) as a signal on the time axis through the processing of the IFFT converting unit 147 (S109), and then converts the converted suppression result signal r(t) to an analog signal with D/A converting means 18 to output the analog signal to the sound processing device 3.

The sound processing device 3 performs voice recognition processing or the like based on the received suppression result signal r(t). In this way, the echo suppression processing of the echo suppressor 1 according to the first embodiment of the present invention is carried out.

Figure 4A:
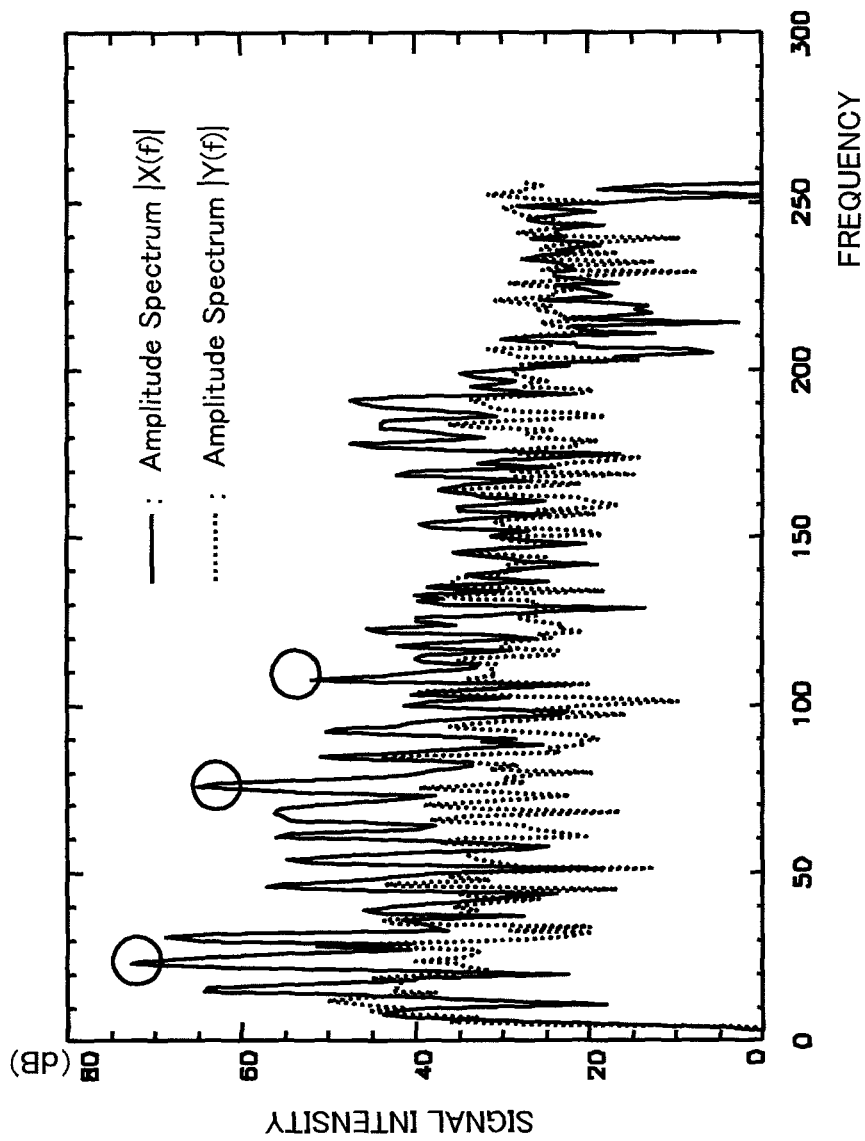
FIGS. 4A and 4B are graphs showing an example of an echo suppression processing result according to the first embodiment of the present invention.
Figure 4B:
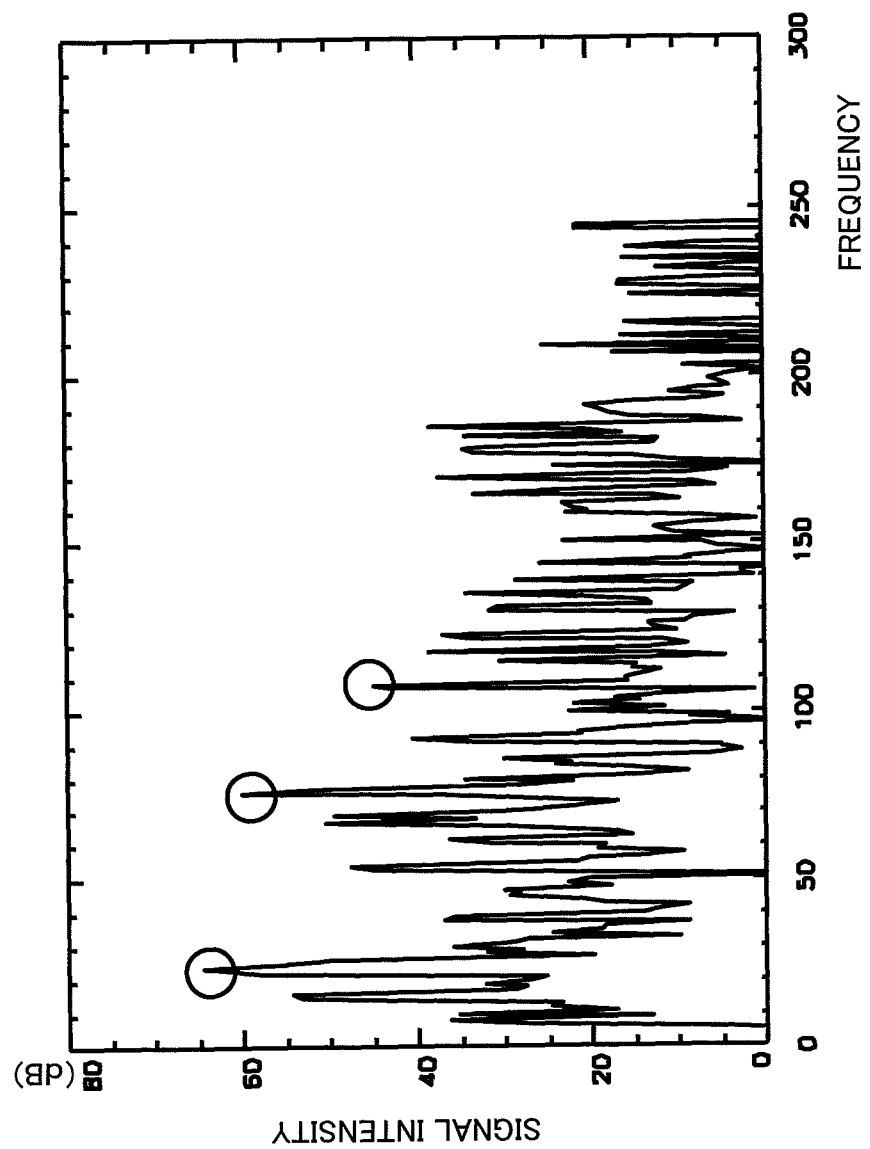

Next, a result of the echo suppression processing of the echo suppressor 1 according to the first embodiment of the present invention is described. FIGS. 4A and 4B are graphs showing an example of the echo suppression processing result according to the first embodiment of the present invention. FIG. 4A is a graph showing an example of an amplitude spectrum |X(f)| of the added reference sound signal x(t) and an amplitude spectrum |Y(f)| of the observation sound signal y(t), which are subjected to the echo suppression processing according to the first embodiment of the present invention. The horizontal axis represents a frequency f, and the vertical axis represents a signal intensity dB. The graph illustrates a relationship therebetween. The solid line indicates the amplitude spectrum |X(f)| of the added reference sound signal x(t), and the dotted line indicates the amplitude spectrum |Y(f)| of the observation sound signal y(t). FIG. 4B is a graph showing an example of an amplitude spectrum |R(f)| of the suppression result signal r(t) as a result of the echo suppression processing according to the first embodiment of the present invention. The horizontal axis represents a frequency f, and the vertical axis represents a signal intensity. The graph illustrates a relationship therebetween. FIGS. 4A and 4B show an amplitude spectrum in a double-talk state. FIG. 4A shows the amplitude before processing, and FIG. 4B shows the amplitude after processing. In addition, in FIGS. 4A and 4B, encircled portions represent a peak of a sound level of a speaker.

As shown in FIG. 4A, in a frequency of sounds including a speaker's voice, a correlation between the amplitude spectrum |X(f)| of the added reference sound signal x(t) and the amplitude spectrum |Y(f)| of the observation sound signal y(t) is low. In FIG. 4B showing the result of processing in FIG. 4A, an intensity level is totally lowered. In a frequency of sounds including a speaker's voice, peak intensity is not so changed. This means that an echo of sounds other than the speaker's voice is suppressed.

In the first embodiment, a frequency range necessary for calculating the correlation $G2(f)$ is a constant band width. However, the present invention is not limited thereto, and a band width may be changed in accordance with a frequency. Next, description is given of a mode where a band width is changed in accordance with a frequency in the first embodiment. In the case of change the band width, the above Equation (2) for calculating the correlation $G2(f)$ is modified to the following Equation (6).

$$G2(f) = \frac{\sum_{i=f-N(f)}^{f+N(f)} \{Y(i)X*(i)\}}{\sum_{i=f-N(f)}^{f+N(f)} \{X(i)X*(i)\}} \quad \text{Equation (6)}$$

In equation (6), the order N(f) representing the number of samples upon sampling is used as a band width. Substituting the order N(f) as the band width, which is constant, into Equation (6) gives Equation (2). In this example, however, the order as the band width varies. FIG. 5 is a graph showing a relationship between the frequency f and the varying band widths N(f) in the echo suppressing method according to the first embodiment of the present invention. In FIG. 5, the horizontal axis represents the frequency f, and the vertical axis represents the order N(f) as a band width. FIG. 5 illustrates a relationship therebetween. As shown in FIG. 5, the band width is increased toward the lowest frequency. This is to increase the band width to the lower frequency that is difficult to detect a difference from an echo to thereby increase the number of samples and relatively increase correlation detection sensitivity to improve a double-talk detection accuracy.

In the case of changing a band width, in step S104 of the flowchart (operation chart) illustrated in FIG. 3, the computation unit 142 determines the correlation $G2(f)$ based on the total value of the reference sound signals X(f) and the total value of the observation sound signals X(f) in a frequency range determined based on each frequency f.

In the first embodiment, the signal ratio $G1(f)$ or the correlation $G2(f)$ is selected and used as the echo estimation factor G(f). However, the present invention is not limited thereto. To suppresses discontinuous changes at the boundary between the single-talk state and the double-talk state, a first constant α1 and a second constant α2 larger than the first constant α1 may be set to define a period in which a weighted average of the signal ratio $G1(f)$ and the correlation $G2(f)$ is used as the echo estimation factor G(f). Next, a different method of determining the echo estimation factor G(f) of the first embodiment is described.

FIG. 6 is a graph showing a relationship between an intensity ratio $|G2(f)|/|G1(f)|$ and a coefficient β, where the intensity ratio $|G2(f)|/|G1(f)|$ is a ratio of an intensity of the correlation $G2(f)$ to that of the signal ratio $G1(f)$ and the coefficient β is corresponding to the echo estimation factor G(f). In FIG. 6, the horizontal axis represents the intensity ratio $|G2(f)|/|G1(f)|$, and the vertical axis represents the coefficient β corresponding to the echo estimation factor G(f). FIG. 6 illustrates a relationship therebetween. The coefficient β(f) is a factor necessary for determining the echo estimation factor G(f). The echo estimation factor G(f) is derived from the following Equation (7) using the coefficient β(f).

$$G(f) = \beta(f)G1(f) + \{1-\beta(f)\}G2(f) \quad \text{Equation (7)}$$

where β(f) is a coefficient corresponding to echo estimation factor G(f).

When the intensity ratio $|G2(f)|/|G1(f)|$ is smaller than the first constant α1, then the coefficient β(f)=0 as shown in FIG. 6, so the equation (7) leads to the correlation $G2(f)$ equal to the echo estimation factor G(f). If the intensity ratio $|G2(f)|/|G1(f)|$ is not smaller than the second constant α2, the factor β(f)=1, so the signal ratio $G1(f)$ is the echo estimation factor G(f). If the intensity ratio $|G2(f)|/|G1(f)|$ is smaller than the second constant α2 and not smaller than the first constant α1, the factor β(f) is determined based on the intensity ratio $|G2(f)|/|G1(f)|$ in accordance with the relationship of FIG. 6, and the echo estimation factor G(f) is determined in accordance with a weighted average of the signal ratio $G1(f)$ and the correlation $G2(f)$ of Equation (7) based on the determined value.

In the case of changing a method of determining the echo estimation factor G(f), in step S106 of the flowchart (operation chart) of FIG. 3, the determination unit 144 determines the echo estimation factor G(f) as follows. That is, if $|G2(f)|<\alpha1|G1(f)|$, the correlation $G2(f)$ is set to the echo estimation factor G(f). If $|G2(f)|\geq\alpha2|G1(f)|$, the signal ration $G1(f)$ is set to the echo estimation factor G(f). If $\alpha1|G1(f)|\leq|G2(f)|<\alpha2|G1(f)|$, then the weighted average of the signal ratio $G1(f)$ and the correlation $G2(f)$ is set to the echo estimation factor G(f).

Figure 7A:
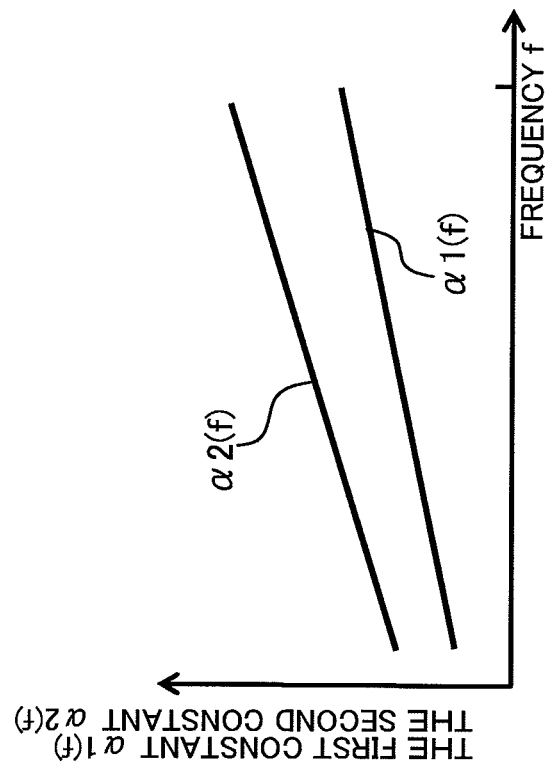
FIGS. 7A and 7B are graphs showing a relationship between a frequency, a first constant, and a second constant when the first constant and the second constant vary depending on the frequency in the echo suppressing method according to the first embodiment of the present invention.
Figure 7B:
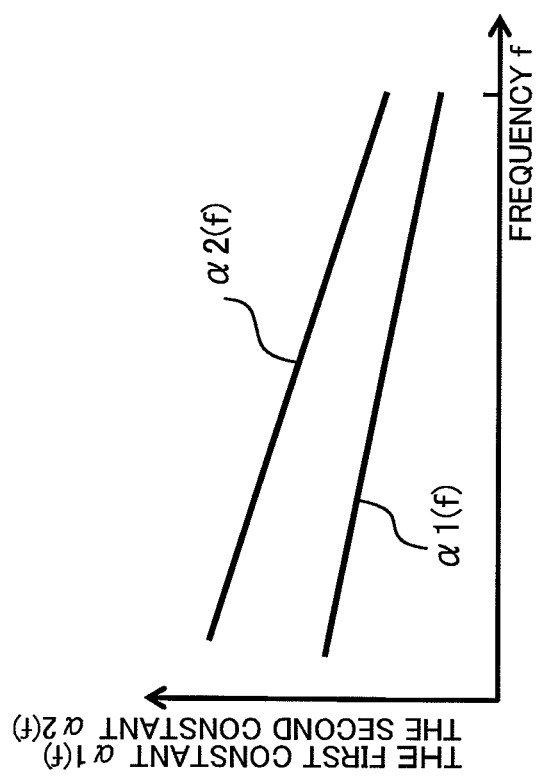

Further, the first constant α1 and the second constant α2 may vary depending on the frequency f. FIGS. 7A and 7B are graphs showing a relationship between the frequency f, a first constant α1(f), and a second constant α2 when the first constant α1 and the second constant α2 vary depending on the frequency f in the echo suppressing method according to the first embodiment of the present invention. In FIGS. 7A and 7B, the horizontal axis represents the frequency f, and the vertical axis represents the first constant α1(f) and second constant α2(f) which are frequency dependent. FIGS. 7A and 7B illustrate a relationship therebetween. In the example of FIG. 7A, the first constant α1(f) and second constant α2(f) are decreased from the low frequency to the high frequency to increase a detection accuracy of the double-talk state to thereby suppress a distortion of a speaker's voice. In the example of FIG. 7B, the first constant α1(f) and second constant α2(f) are increased from the low frequency to the high frequency to increase a detection accuracy of the single-talk state to thereby suppress a residual echo. Here, if a single constant α is used, a frequency f-dependent constant α(f) can be used.

Second Embodiment

According to a second embodiment, a real amplitude spectrum is used for operations for correction in the first embodiment. The configuration of an echo suppressor of the second embodiment is the same as that of the first embodiment as illustrated in FIG. 1 and thus shall be referred to the first embodiment. Its description is not repeated here. In the following description, the same components as those of the first embodiment are denoted by reference numerals identical to those of the first embodiment, and are not described here.

Figure 8:
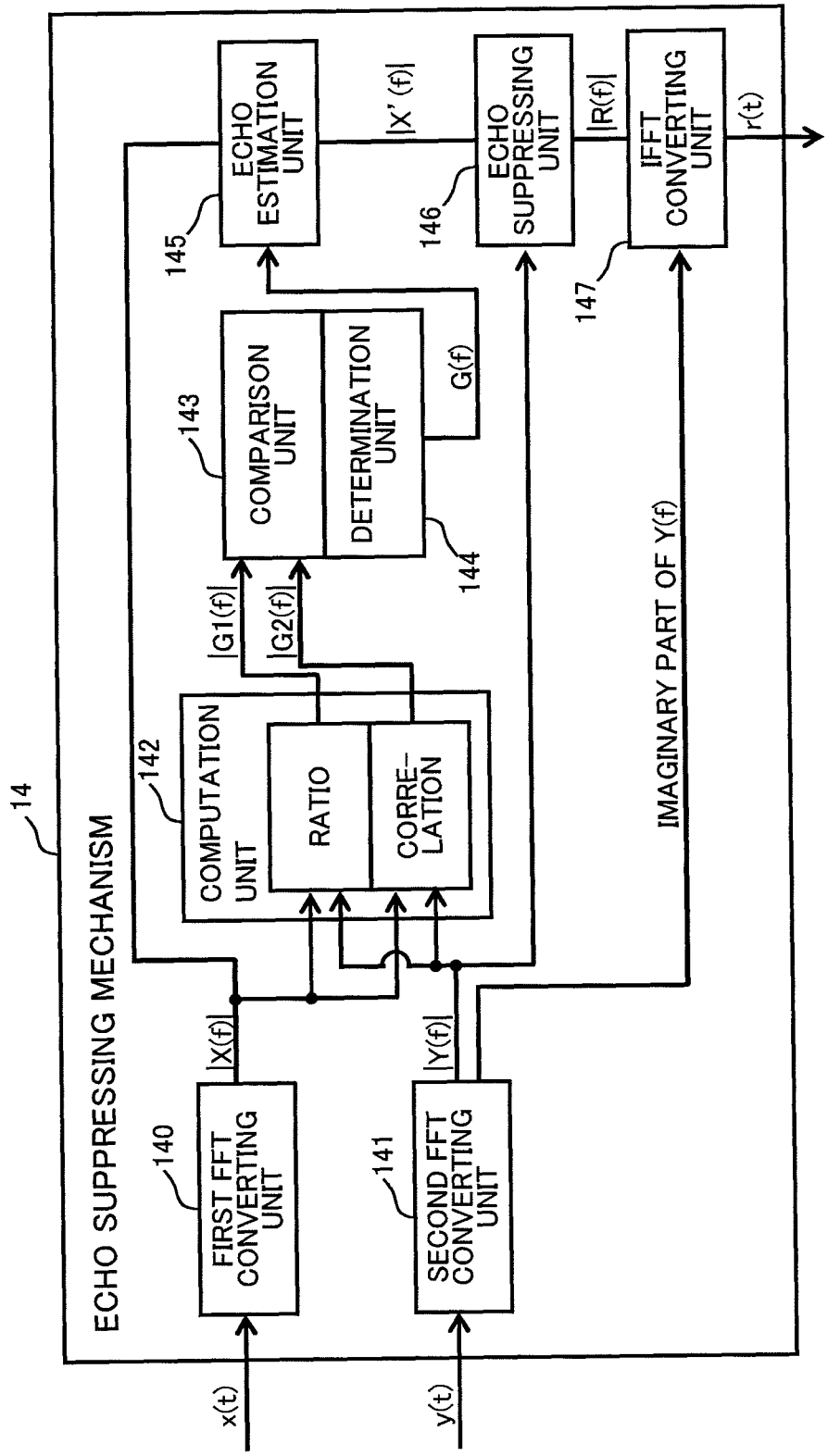
FIG. 8 is a functional block diagram showing a functional configuration example of an echo suppressing mechanism of an echo suppressor according to a second embodiment of the present invention.

FIG. 8 is a functional block diagram showing a functional configuration example of the echo suppressing mechanism 14 of the echo suppressor 1 according to the second embodiment of the present invention. The echo suppressing mechanism 14 of the echo suppressor 1 clips frames of a predetermined temporal length from the added reference sound signal x(t) and the observation sound signal y(t), where the signals x(t) and y(t) are converted to digital signals. The echo suppressing mechanism 14 executes the computer program 100 to function as the first FFT converting unit 140 and the second FFT converting unit 141. The reference sound signal X(f) generated with the first FFT converting unit 140 and the observation sound signal Y(f) generated with the second FFT converting unit 141 have complex spectrum. In the second embodiment, the processing is executed using an amplitude spectrum that is a real part of the complex spectrum of the signals generated with the first FFT converting unit 140 and the second FFT converting unit 141. In the following description, the amplitude spectrum of the reference sound signal X(f) as the complex spectrum is referred to as the reference sound signal |X(f)|, and the amplitude spectrum of the observation sound signal Y(f) as the complex spectrum is referred to as the observation sound signal |Y(f)|.

Further, the echo suppressing mechanism 14 executes the computer program 100 to function as the computation unit 142. The reference sound signal |X(f)| and the observation sound signal |Y(f)| processed with the computation unit 142 are each amplitude spectrum and thus may not be multiplied by the complex conjugate number X*(f) to a real number. Accordingly, in the second embodiment, the computation unit 142 derives a signal ratio $|G1(f)|'$ as a real number from the following equation (8) in place of equation (1).

$$|G1(f)|' = |Y(f)|/|X(f)| \qquad \text{Equation (8)}$$

where $|G1(f)|'$ is the signal ratio, |Y(f)| is the observation sound signal, and |X(f)| is the reference sound signal.

Further, in the second embodiment, the computation unit 142 determines a correlation $|G2(f)|'$ as a real number from the following Equation (9) in place of Equation (2).

$$|G2(f)|' = \Sigma\{|Y(f)|\,|X(f)|\}/\Sigma\{|X(f)|^2\} \qquad \text{Equation (9)}$$

where $|G2(f)|'$ is the correlation.

Further, the echo suppressing mechanism 14 executes the computer program 100 to function as the comparison unit 143 and the determination unit 144. The comparison unit 143 compares the signal ratio $|G1(f)|'$ and α-fold correlation |G2(f)|' based on the following equation (10) in place of equation (3), where α represents a predetermined constant.

$$|G1(f)|' < \alpha|G2(f)|' \qquad \text{Equation (10)}$$

If the signal ratio $|G1(f)|$ is smaller than the α-fold correlation |G2(f)|, the determination unit 144 judges a current state as a single-talk state with a high correlation between the observation sound signal Y(f) and the reference sound signal X(f), and determines the echo estimation factor |G(f)| that satisfies a relationship of $|G(f)|=|G1(f)|$. If the signal ratio $|G1(f)|$ is not smaller than the α-fold correlation |G2(f)|, the determination unit 144 judges a current state as a double-talk state with a low correlation between the observation sound signal Y(f) and the reference sound signal X(f), and determines the echo estimation factor |G(f)| that satisfies a relationship of $|G(f)|=|G2(f)|$.

Further, the echo suppressing mechanism 14 executes the computer program 100 to function as the echo estimation unit 145. In the second embodiment, the echo estimation unit 145 derives an echo |X'(f)| as a real number from the following equation (11) in place of equation (4).

$$|X'(f)| = |G(f)|\,|X(f)| \qquad \text{Equation (11)}$$

where |X'(f)| is the echo.

Further, the echo suppressing mechanism 14 executes the computer program 100 to function as the echo suppressing unit 146. In the second embodiment, the echo suppressing unit 146 derives a suppression result signal |R(f)| as a real number from the following equation (12) in place of equation (5).

$$|R(f)| = |Y(f)| - |X'(f)| \qquad \text{Equation (12)}$$

where |R(f)| is the suppression result signal.

Further, the echo suppressing mechanism 14 executes the computer program 100 to function as the IFFT converting unit 147 that combines the suppression result signal R(f) as a real number and an imaginary part of the observation sound signal Y(f) generated with the second FFT converting unit 141 to convert the composite signal to a signal on a time axis (in a time domain) through IFFT processing. The suppression result signal r(t) converted to a signal on the time axis is converted to an analog signal with the D/A converting mechanism 15 and then output to the sound processing device 3.

The sound processing device 3 executes the voice recognition processing or the like based on the received suppression result signal r(t). In this way, the echo suppressing processing of the echo suppressor 1 according to the second embodiment of the present invention is carried out.

Next, the processing of the echo suppressor 1 according to the second embodiment of the present invention is described. The echo suppressor 1 outputs signals generated using n reference sound signals x1(t), - - - , and xn(t) and the observation sound signal y(t) to the echo suppressing mechanism 14 similar to the first embodiment.

Figure 9:
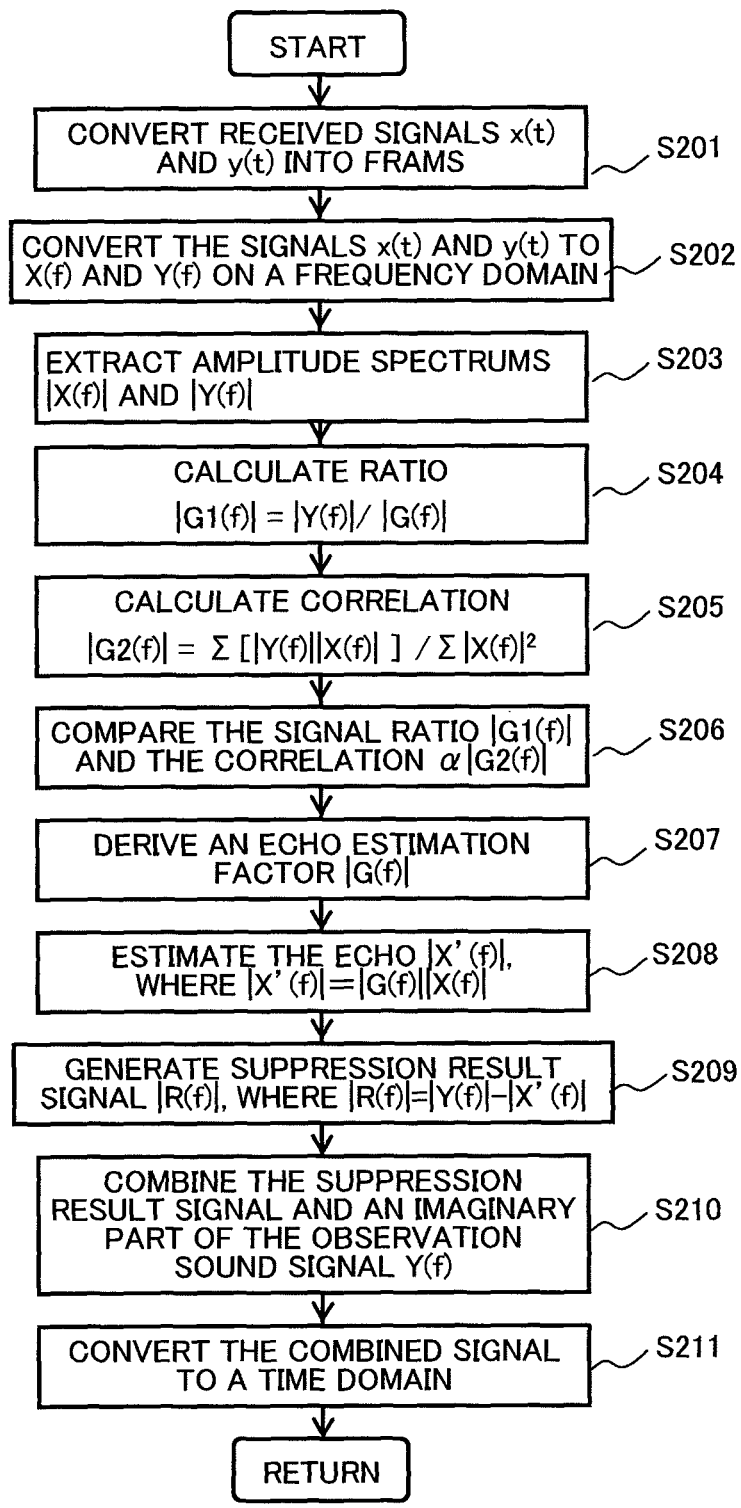
FIG. 9 is a flowchart (operation chart) showing an example of processing of the echo suppressor according to the second embodiment of the present invention.

FIG. 9 is a flowchart (operation chart) showing an example of the processing of the echo suppressor 1 according to the second embodiment of the present invention. The echo suppressing mechanism 14 of the echo suppressor 1 converts the received added reference sound signal x(t) and observation sound signal y(t) into frames (S201). Then, the echo suppressing mechanism 14 converts the added reference sound signal x(t) and the observation sound signal y(t) into the reference sound signal X(f) and the observation sound signal Y(f) as components on the frequency axis with the first FFT converting unit 140 and the second FFT converting unit 141 (S202). Then, the reference sound signal |X(f)| and the observation sound signal |Y(f)| as an amplitude spectrum are extracted from the reference sound signal X(f) and the observation sound signal Y(f), respectively (S203).

The echo suppressing mechanism 14 of the echo suppressor 1 calculates the signal ratio $|G1(f)|'$ between the reference sound signal |X(f)| and the observation sound signal |Y(f)| at each frequency f through the processing of the computation unit 142 (S204), and in addition, calculates the correlation $|G2(f)|'$ between the reference sound signal |X(f)| and the observation sound signal |Y(f)| at each frequency f (S205). In step S204, the signal ratio $|G1(f)|'$ is calculated based on the above equation (8), and in step S205, the correlation $|G2(f)|'$ is calculated based on the above equation (9).

The echo suppressing mechanism 14 of the echo suppressor 1 compares the signal ratio $|G1(f)|'$ and the correlation $|G2(f)|'$ with the comparison unit 143 (S206), and derives the echo estimation coefficient |G(f)| necessary for echo estimation from the signal ratio $|G1(f)|'$ and the correlation $|G2(f)|'$ based on the comparison result (S207). The signal ratio |G1

(f)|' or the correlation |G2(f)|' is selected upon deriving the echo estimation coefficient |G(f)| in step S207, based on the above equations (8) to (10).

The echo suppressing mechanism 14 of the echo suppressor 1 estimates the echo |X'(f)| based on the echo estimation coefficient |G(f)| and the reference sound signal |X(f)| through the processing of the echo estimation unit 145 (S208). In step S208, the echo |X'(f)| is calculated as an estimate value of echo for correcting the observation sound signal |Y(f)| based on the above Equation (11).

The echo suppressing mechanism 14 of the echo suppressor 1 suppresses the observation sound signal |Y(f)| based on the echo |X'(f)| to generate the suppression result signal |R(f)| through the processing of the echo suppressing unit 146 (S209). In step S209, the correction is performed to remove the echo |X'(f)| from the observation sound signal |Y(f)| based on the above Equation (12).

The echo suppressing mechanism 14 of the echo suppressor 1 combines the suppression result signal |R(f)| as a real number and an imaginary part of the observation sound signal Y(f) generated with the second FFT converting unit 141 through the processing of the IFFT converting unit 147 (S210). Further the echo suppressing mechanism 14 converts the composite signal to the suppression result signal r(t) as a signal on a time axis through the processing of the IFFT converting unit 147 (S211). Then, the converted suppression result signal r(t) is converted to an analog signal with the D/A converting means 18 and output to the sound processing device 3.

The sound processing device 3 performs voice recognition processing or the like based on the received suppression result signal r(t). In this way, the echo suppression processing of the echo suppressor 1 according to the second embodiment of the present invention is carried out.

In the second embodiment, an echo is suppressed by removing the echo |X'(f)| from the observation sound signal |Y(f)| upon the correction with the echo suppressing unit 146. However, the present invention is not limited thereto. The observation sound signal |Y(f)| may be attenuated to suppress an echo. Next, description is given of an example of the second embodiment, in which the observation sound signal |Y(f)| may be attenuated to suppress an echo.

Figure 10:
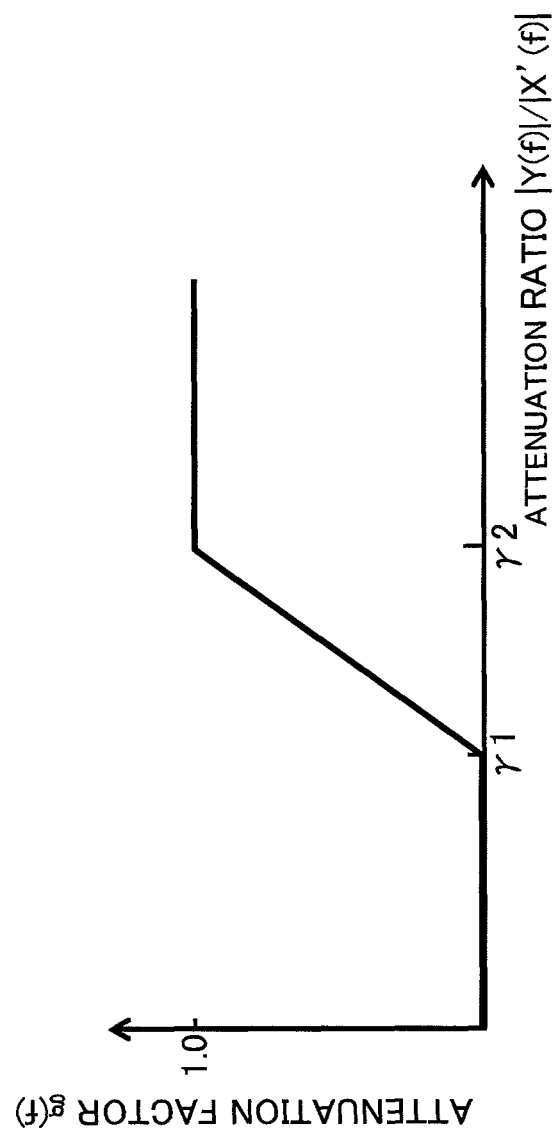
FIG. 10 is a graph showing a relationship between an attenuation ratio and an attenuation coefficient in an echo suppressing method according to the second embodiment of the present invention.

FIG. 10 is a graph showing a relationship between an attenuation ratio |Y(f)|/|X'(f)| and an attenuation factor g(f) in the echo suppressing method according to the second embodiment of the present invention. In FIG. 10, the horizontal axis represents the attenuation ratio |Y(f)|/|X'(f)|, and the vertical axis represents the attenuation factor g(f). FIG. 10 illustrates a relationship therebetween. The attenuation ratio |Y(f)|/|X'(f)| is a ratio of the observation sound signal |Y(f)| and the echo |X'(f)|. The attenuation factor g(f) is a factor for calculating the suppression result signal |R(f)| by multiplying the observation sound signal |Y(f)|. The factor takes a value of $0 \leq g(f) \leq 1$. The larger the value is, the larger an attenuation amount is. As the attenuation ratio |Y(f)|/|X'(f)|, a first threshold value γ1 and a second threshold value γ2 are set. If the attenuation ratio |Y(f)|/|X'(f)| is smaller than the first threshold value γ1, the attenuation factor g(f)=0. If the ratio is not smaller than the second threshold value γ2, the attenuation factor g(f)=1. If the attenuation ratio |Y(f)|/|X'(f)| is not smaller than the first threshold value γ1 and smaller than the second threshold value γ2, the attenuation factor g(f) is determined in accordance with the attenuation ratio |Y(f)|/|X'(f)| based on the relationship of FIG. 10. Further, a relationship between the attenuation factor g(f), the observation sound signal |Y(f)|, and the suppression result signal |R(f)| is determined based on the following equation (13).

$$|R(f)|=g(f)|Y(f)|$$ Equation (13)

where g(f) is the attenuation factor.

In the case of using the attenuation factor g(f), in step S209 of the flowchart (operation chart) of FIG. 9, the attenuation factor g(t) is determined based on the observation sound signal |Y(f)| and the echo |X'(f)| through the processing of the echo suppressing unit 146, the suppression result signal |R(f)| is generated based on the observation sound signal |Y(f)| and the determined attenuation factor g(f). In addition, the suppression result signal |R(f)| is generated based on Equation (13), and the observation sound signal |Y(f)| is attenuated using the attenuation factor g(f) to suppress an echo.

Figure 11:
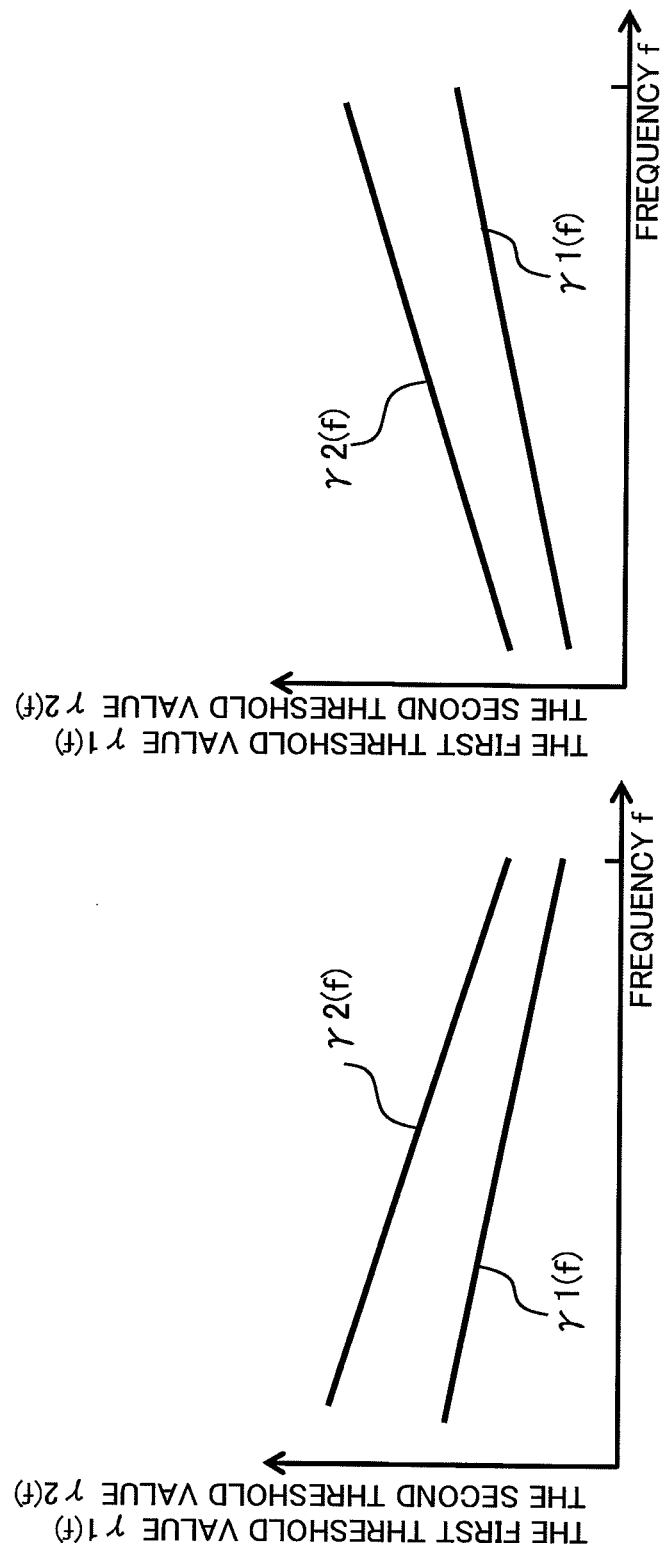
FIGS. 11A and 11B are graphs showing a relationship between a frequency, and a first threshold value and a second threshold value, which vary depending on the frequency in the echo suppressing method according to the second embodiment of the present invention.
Figure 12:
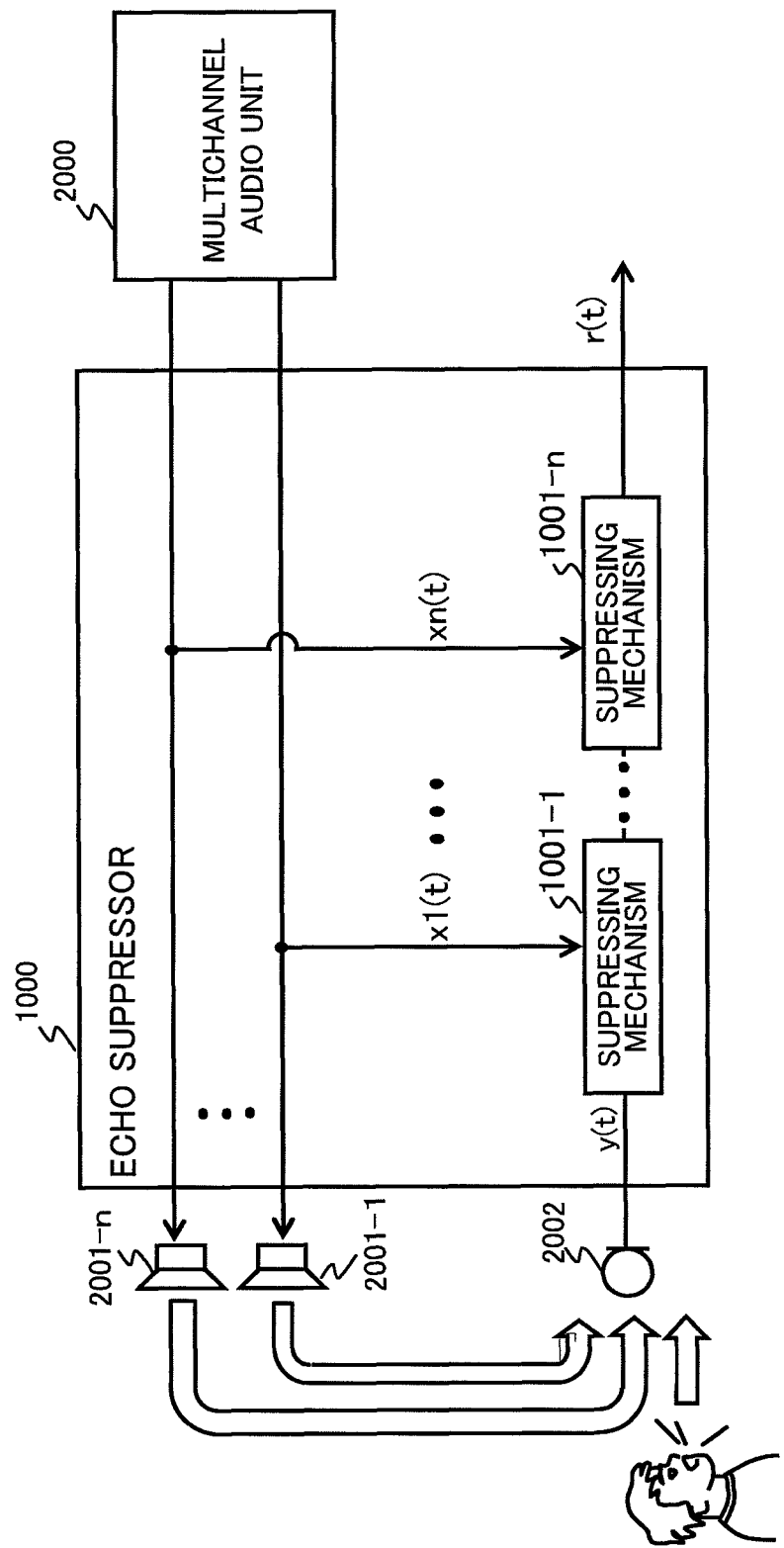
FIG. 12 is a schematic diagram showing the configuration of a conventional first echo suppressor.
Figure 13:
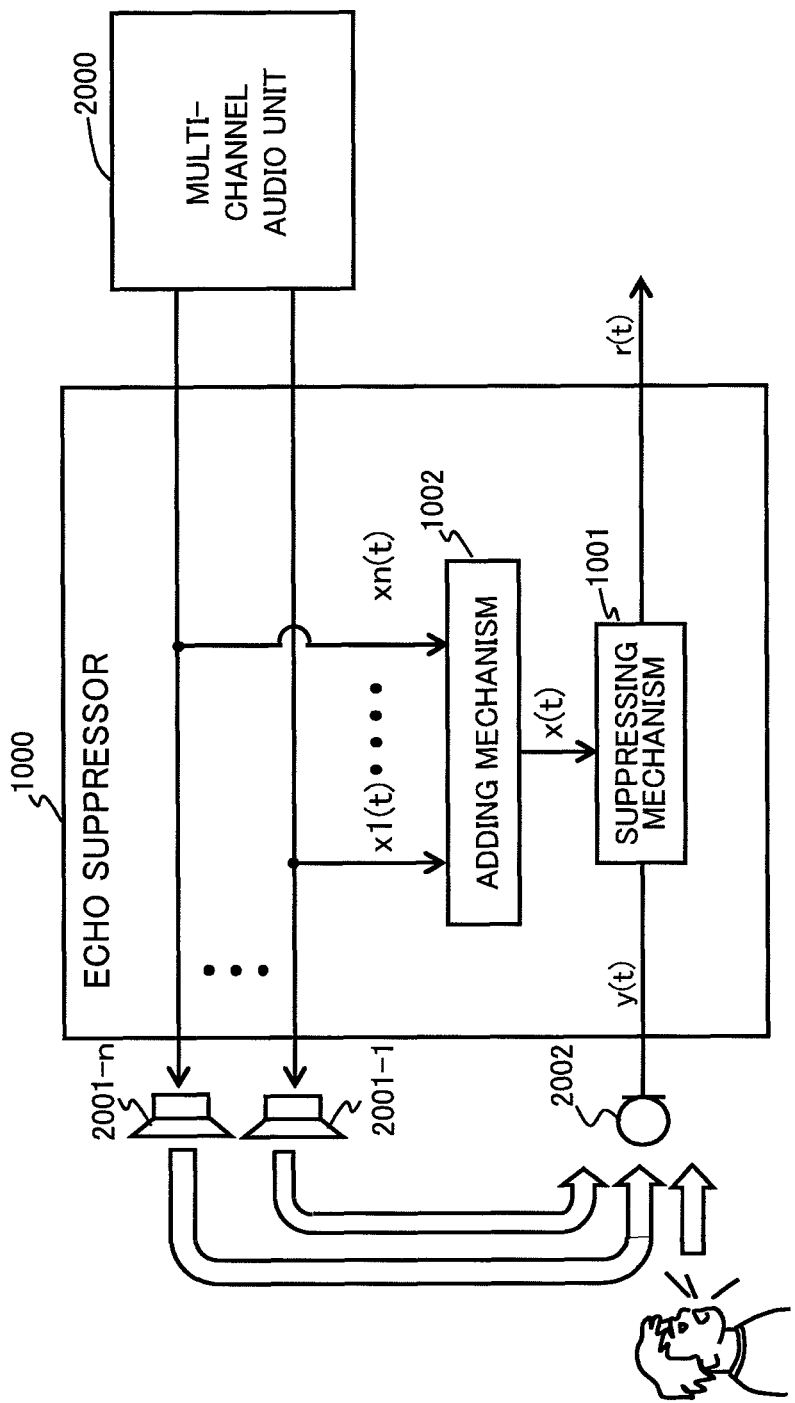
FIG. 13 is a schematic diagram showing the configuration of a conventional second echo suppressor.
Figure 14:
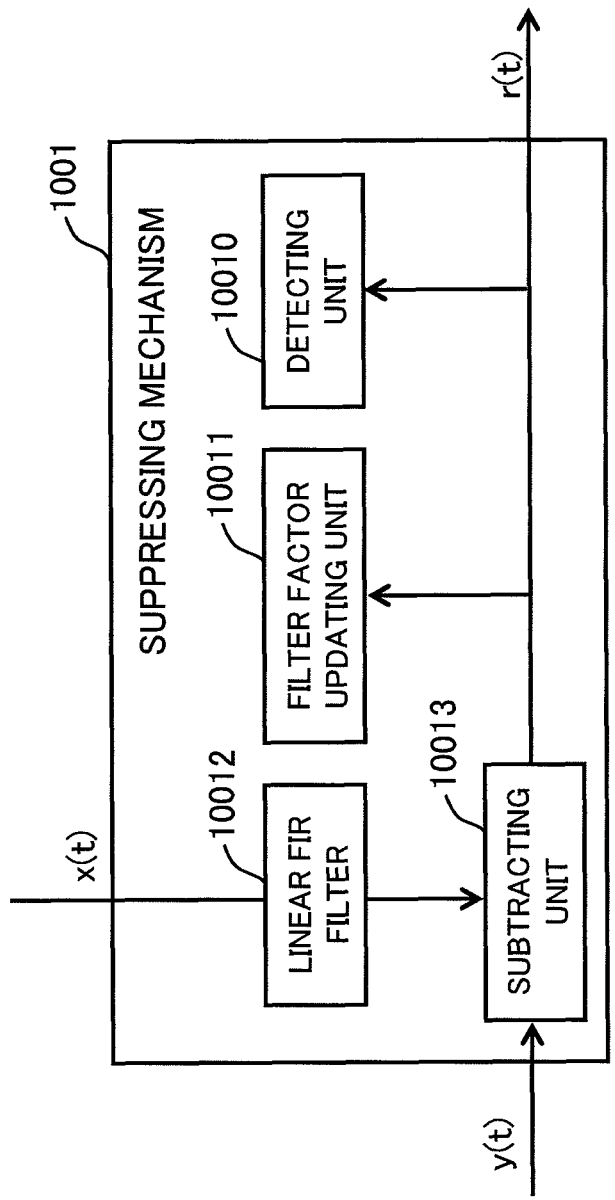
FIG. 14 is a functional block diagram showing the functional configuration of a suppressing mechanism of the conventional echo suppressor.

Further, the first threshold value γ1 and the second threshold value γ2 may vary depending on the frequency f. FIGS. 11A and 11B show examples of relationship between the frequency f, and the first threshold value γ1 and the second threshold value γ2, which vary depending on the frequency in the echo suppressing method according to the second embodiment of the present invention. In FIGS. 11A and 11B, the horizontal axis represents the frequency f, and the vertical axis represents the frequency f-dependent first threshold value γ1 and second threshold value γ2. FIGS. 11A and 11B illustrate a relationship therebetween. In the example of FIG. 11A, the first threshold value γ1 and second threshold value γ2 are decreased from the lower frequency to the higher frequency to improve a detection accuracy of the double-talk state to suppress a distortion of a speaker's voice. In the example of FIG. 11B, the first threshold value γ1 and second threshold value γ2 are decreased from the lower frequency to the higher frequency to increase a detection accuracy of the single-talk state to thereby suppress a residual echo.

The first and second embodiments are illustrative ones of innumerable embodiments of the present invention. The configurations of various kinds of hardware and software components may be arbitrarily set, and various processings may be used in combination with the above-described basic processings. For example, the present invention may be applied to a suppressor provided with a single output unit, while in the first and second embodiments plural output units are provided. In addition, as the sound processing device, the present invention is applicable to various systems for processing a voice or sound of a teleconference system, a car navigation system, or the like. Moreover, the echo suppressor, the sound output device, and the sound processing device may be integrated into one device.

What is claimed is:

1. An apparatus for suppressing an echo signal included in a measured signal corresponding to a measured sound, the apparatus being capable of coupling to a sound input device for receiving the measured sound and a sound output device for outputting a sound associated with a reference signal, the apparatus comprising:

a part which performs each transformation of both the measured signal and the reference signal in a time domain to both the measured signal and the reference signal in a frequency domain;

a part which obtains each value of a ratio and a correlation between the measured signal and the reference signal in the frequency domain, the ratio and the correlation being obtained directly from the measured signal and the reference signal in the frequency domain;

a part which derives a coefficient decided in accordance with a larger value that is selected from the value of the ratio and the value of the correlation;

a part which obtains an estimated value of the echo signal on the basis of a product of the coefficient and the reference signal in the frequency domain; and a part which suppresses the echo signal in the measured signal by subtracting the estimated value of the echo signal from the measured signal, respectively in the frequency domain.

2. The apparatus according to claim 1, further comprising: a part which adds a plurality of reference signals for a resultant reference signal, wherein the part which performs each transformation of both the measured signal and the reference signal transforms both the measured signal and the resultant reference signal in the time domain to both the measured signal and the resultant reference signal in the frequency domain.

3. The apparatus according to claim 1, wherein the part which obtains each value of the ratio and the correlation processes a calculation of a correlation between the measured signal and the reference signal in the frequency domain at each frequency in a predetermined range of frequency around a specific frequency, and the predetermined range of frequency is controlled according to the specific frequency.

4. The apparatus according to claim 1, wherein the part which derives the coefficient further sets a plurality of thresholds for comparing the ratio with the correlation and determines on the basis of the plurality of thresholds, the ratio, and the correlation whether the measured sound signal is measured in a state of a single talk or a double talk.

5. The apparatus according to claim 4, wherein one of the plurality of thresholds is set according to in accordance with the frequency.

6. The apparatus according to claim 1, wherein the part which obtains each value the part performs a calculation of the ratio and the correlation on the basis of each amplitude spectrum of the measured signal and the reference signal transformed in the frequency domain.

7. The apparatus according to 6, wherein the part which obtains the estimated value estimates an amplitude of the echo signal and the part which suppresses the echo signal suppresses an amplitude of the measured signal on the case of a ratio of the amplitude spectrum of the measured signal to the amplitude spectrum of the echo signal being not less than a predetermined value.

8. The apparatus according to claim 7, wherein the predetermined value varies according to a frequency.

9. The apparatus according to claim 1, wherein the apparatus is capable of being coupled to a sound processing device for processing an echo suppressed sound signal which is outputted from the apparatus.

10. A method of suppressing an echo signal included in a measured signal corresponding to a measured sound, the method comprising the operations of:

performing each transformation of the measured signal and a reference signal in a time domain to a frequency domain, the reference signal being corresponding with a source signal for generating a sound;

processing a calculation for obtaining each value of a ratio and a correlation between the measured signal and the reference signal in the frequency domain, the values of ratio and correlation being obtained directly from the measured signal and the reference signal in the frequency domain;

deriving a coefficient decided in accordance with a larger value that is selected from the value of the ratio and the value of the correlation;

executing an estimated value of the echo signal on the basis of a product of the coefficient and the reference signal in the frequency domain; and suppressing the echo signal in the measured signal by subtracting the estimated vales of the echo signal from the measured signal, respectively in the frequency domain.

11. A storage medium storing a computer-readable program for causing a computer to execute an echo suppression method cooperating with a sound output device and a sound processing device, the method comprising the operations of:

performing each transformation of a measured signal and a reference signal in a time domain to a frequency domain, the reference signal being corresponding with a source signal for generating a sound;

processing a calculation for obtaining each value of a ratio and a correlation between the measured signal and the reference signal in the frequency domain, the values of ratio and correlation being obtained directly from the measured signal and the reference signal in the frequency domain;

deriving a coefficient decided in accordance with a larger value that is selected from the value of the ratio and the value of the correlation;

executing an estimated value of the echo signal on the basis of a product of the coefficient and the reference signal in the frequency domain; and suppressing the echo signal in the measured signal by subtracting the estimated vales of the echo signal from the measured signal, respectively in the frequency domain.

* * * * *